United States Patent
Cox et al.

(10) Patent No.: US 10,839,715 B2
(45) Date of Patent: Nov. 17, 2020

(54) TRAINING SYSTEM AND SIMULATION METHOD FOR GROUND TRAVEL IN AIRCRAFT EQUIPPED WITH NON-ENGINE DRIVE MEANS

(71) Applicants: Rodney T. Cox, North Plains, OR (US); Jan Vana, Prague (CZ); Joseph Goldman, Pikesville, MD (US); Isaiah W. Cox, London (GB)

(72) Inventors: Rodney T. Cox, North Plains, OR (US); Jan Vana, Prague (CZ); Joseph Goldman, Pikesville, MD (US); Isaiah W. Cox, London (GB)

(73) Assignee: Borealis Technical Limited, Gibraltar (GI)

( * ) Notice: Subject to any disclaimer, the term of this patent is extended or adjusted under 35 U.S.C. 154(b) by 0 days.

(21) Appl. No.: 13/736,052

(22) Filed: Jan. 7, 2013

(65) Prior Publication Data

US 2014/0193780 A1 Jul. 10, 2014
US 2016/0140871 A9 May 19, 2016

Related U.S. Application Data

(60) Provisional application No. 61/584,106, filed on Jan. 6, 2012.

(51) Int. Cl.
*G09B 19/16* (2006.01)

(52) U.S. Cl.
CPC .................. *G09B 19/165* (2013.01)

(58) Field of Classification Search
CPC ...... G09B 19/14; G09B 19/16; G09B 19/162; G09B 19/165; G09B 19/167; G09B 9/00; G09B 9/04; G09B 9/048; G09B 9/05; G09B 9/08; G09B 9/085; G09B 9/10; G09B 9/30; G09B 9/42; G09B 9/48; G09B 9/50

See application file for complete search history.

(56) References Cited

U.S. PATENT DOCUMENTS

| | | | |
|---|---|---|---|
| 5,961,331 A | 10/1999 | Fisch | |
| 6,053,736 A * | 4/2000 | Huffman et al. | 434/11 |
| 7,226,018 B2 | 6/2007 | Sullivan | |
| 7,445,178 B2 | 11/2008 | McCoskey et al. | |
| RE41,396 E | 6/2010 | Clark et al. | |

(Continued)

OTHER PUBLICATIONS

Air_pushback.pdf—retrieved from <http://web.archive.org/web/20120617070301/http://www.l-3training.com/docs/brochures/Air_Pushback.pdf> on Jun. 2, 2014—verifed present by webarchive.org as early as Jun. 17, 2012.*

(Continued)

*Primary Examiner* — Timothy A Musselman

(57) ABSTRACT

A training system and method for operating aircraft equipped with non-engine drive means during independent ground travel is provided. The system and method of the present invention is designed specifically to train pilots, ground personnel, and air traffic control to move an aircraft safely and efficiently on the ground during taxi and pushback using the aircraft's non-engine drive means to propel the aircraft independently during ground travel. Simulations and procedures for training pilots and ramp personnel in the conduct of pushback operations and forward taxi with an aircraft equipped with non-engine drive means are also provided.

10 Claims, 1 Drawing Sheet

(56) References Cited

U.S. PATENT DOCUMENTS

| | | | |
|---|---|---|---|
| 7,975,960 B2 | 7/2011 | Cox | |
| 8,220,740 B2 | 7/2012 | Cox et al. | |
| 2007/0166692 A1* | 7/2007 | Thengvall | G06Q 10/0631 |
| | | | 434/372 |
| 2009/0294577 A1 | 12/2009 | Roques et al. | |
| 2011/0207091 A1* | 8/2011 | Palmer, Jr. | G09B 9/30 |
| | | | 434/43 |
| 2014/0120500 A1* | 5/2014 | Wong | G09B 19/165 |
| | | | 434/35 |

OTHER PUBLICATIONS objectplacement.pdf—retrieved from: http://www.fsdeveloper.com/wiki/index.php?title=Object_Placement_Tool_(FSX)[Sep. 8, 2015 10:48:22 AM].*

ATCcomm.pdf—retrieved from: https://support.microsoft.com/en-us/kb/177252[Sep. 8, 2015 10:45:31 AM].* pushback.pdf—retrieved from: https://support.microsoft.com/en-us/kb/910218[Sep. 8, 2015 10:31:29 AM].*

EVDCompetencyCourse.pdf - VFIS C10:011 (REV Nov. 1997) Retrieved from <http://www.ncdoi.com/OSFM/Fire_Rescue_Commission/Documents/DO_LessonPlans/EVDCompetencyCourse.pdf> on Jun. 8, 2016.*

BWIprocedures.pdf—Sep. 30, 2008—BWI Tenant Directive—'Aircraft Parking, Pushback and Reverse-Thrust Power—Back Procedures'—retrieved from <https://www.marylandaviation.com/media/.../bwitenantdirectives/TD-BWI-203.1.pdf> on Apr. 16, 2017.* pushback_wiki.pdf—Retrieved from <http://web.archive.org/web/20090207081123/https://en.wikipedia.org/wiki/Pushback> on Apr. 16, 2017.*

FS2004addons.pdf—retrieved from https://simviation.com/acinstall.htm[Jan. 4, 2020 12:37:20 PM].*

\* cited by examiner

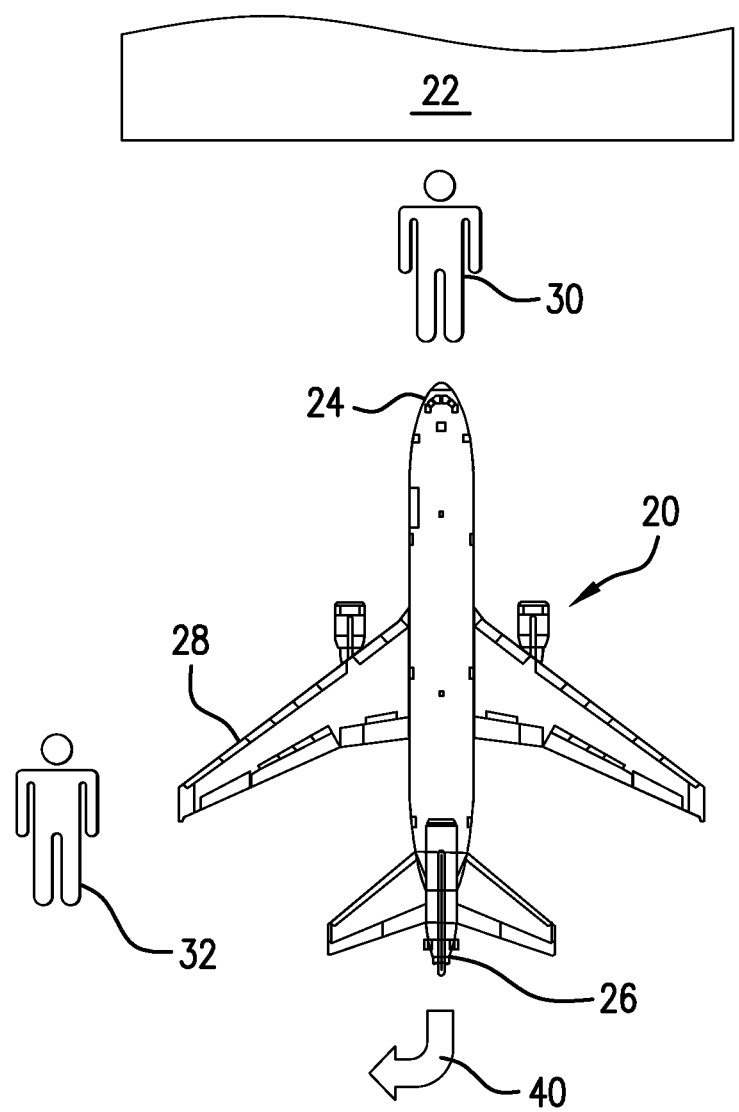

TRAINING SYSTEM AND SIMULATION METHOD FOR GROUND TRAVEL IN AIRCRAFT EQUIPPED WITH NON-ENGINE DRIVE MEANS

PRIORITY CLAIM

This application claims priority from U.S. Provisional Patent Application No. 61/584,106, filed Jan. 6, 2012, the disclosure of which is fully incorporated herein.

TECHNICAL FIELD

The present invention is directed generally to training simulations and methods for training aircraft pilots, air traffic controllers, and ground personnel for taxi and pushback operations and specifically to a training system and simulation method for training airport personnel and operators of aircraft equipped with non-engine ground drive means controllable to move the aircraft on the ground to operate such aircraft to ensure safe and efficient aircraft ground travel.

BACKGROUND OF THE INVENTION

It is acknowledged that many, if not most, delays in aircraft arrivals and departures result from delays in aircraft ground travel between landing and takeoff. It is additionally acknowledged that minimizing the time an aircraft spends sitting idle on the ground between taxi-in after landing and taxi-out prior to takeoff maximizes airline and airport savings. More efficient airport operation reduces the time aircraft are stacked above airports awaiting landing slots by increasing the availability of ground slots. At many airports, space is constrained. Aircraft that are waiting to be towed or pushed back block the ramp area and taxiways, delaying the movement of incoming aircraft into the runways and then to the gate and blocking the transit of ground vehicles. It is desired to keep the time an aircraft spends on the ground at an airport between landing, arrival at and departure from the gate, and take-off to the minimum required to unload arriving passengers and cargo, service the aircraft, and load departing passengers and cargo. Minimizing aircraft air time awaiting landing and minimizing aircraft ground time not only reduces delays in airline flight schedules, but also increases the possibility that an airline can schedule additional flights, providing travelers with more options and improving airline profits.

The replacement of an aircraft's main engines and external tow vehicles to more efficiently move the aircraft during taxi from a landing runway to a parking location upon arrival and then to a departure runway for takeoff by has been proposed. U.S. Patent Publication No. US2009/0294577 to Rogues et al, for example, describes a device that enables an aircraft to move autonomously on the ground that employs a very specifically defined spiral drive gear to turn an aircraft wheel. In U.S. Pat. No. 7,445,178, McCoskey et al describe a powered nose aircraft wheel system useful in a method of taxiing an aircraft that can minimize the assistance needed from tugs and the aircraft engines. U.S. Pat. No. 7,226,018 to Sullivan also describes a wheel motor useful in an aircraft landing gear wheel designed to provide motive force to an aircraft wheel when electric power is applied. U.S. Pat. No. 7,975,960 to Cox et al and U.S. Pat. No. 8,220,740 to Cox et al, owned in common with the present application, describe a nose wheel control apparatus capable of driving a taxiing aircraft without the use of the aircraft main engines or tow vehicles. None of the foregoing patents or published applications, however, suggests systems or methods by which the non-engine drive systems described therein may be simulated or used in any way for training pilots, ground personnel and air traffic control personnel or other aircraft and/or airport operators in the effective use of such systems. All of the personnel involved with achieving and monitoring an aircraft's safe and efficient ground travel operations must be familiar with not only how these non-engine drive means operate, but also how the taxi and pushback of aircraft equipped with such drive means must be controlled to enable aircraft equipped with them to taxi and pushback safely and efficiently.

The simulation of aircraft ground taxi is described in U.S. Pat. No. RE41,396 to Clark et al in connection with a computer-based system and software for tracking and planning ground movement of an aircraft or other vehicle by ground movement segments. It is not suggested that the aircraft or other vehicle with which this system could be used is or could be driven by non-engine drive means, however. U.S. Pat. No. 5,961,331 to Fisch discloses a computerized air traffic voice interactive simulator for simulating communications between an aircraft pilot and air traffic control, including air traffic ground control. This system is specifically designed to simulate aircraft in flight, and its use for training pilots or air traffic control in taxi, pushback, or other ground travel in an aircraft equipped with non-engine drive means is not suggested.

A need clearly exists for a training system and simulation method for training airport ground and air traffic control personnel as well as for pilots and other operators of aircraft equipped with non-engine drive means controllable to move aircraft independently during taxi and pushback which ensures that ground movement of these aircraft is conducted as safely and efficiently as possible. The benefits of the increased efficiency in ground operations resulting from such training include more efficient handling of incoming aircraft and an increase in the number of landing slots.

SUMMARY OF THE INVENTION

It is a primary object of the present invention, therefore, to overcome the deficiencies of the prior art and to provide a training system and method for training airport ground personnel, air traffic control personnel, and pilots and other operators of aircraft equipped with non-engine drive means controllable to move aircraft independently during taxi and pushback which that produces safe and efficient ground movement.

It is another object of the present invention to provide a training system and method for aircraft equipped with non-engine drive means for ground travel designed to include the aircraft's pilot, ramp personnel, maintenance, and ground operations to optimize efficiency of aircraft taxi and pushback operations, thereby directly and indirectly increasing the efficiency of landing and gate operations.

It is an additional object of the present invention to provide a training system and method for aircraft equipped with non-engine drive means for ground travel from runway to gate and from gate to runway capable of using existing protocols and standard regulatory practices.

It is a further object of the present invention to provide a training system and simulation method for aircraft equipped with non-engine drive means for ground travel that includes pushback training for pilots of such aircraft with simulated ramp and/or ground personnel.

It is yet another object of the present invention to provide a training system and simulation method for aircraft equipped with non-engine drive means for ground travel that can be incorporated into standard aircraft ground movement training.

It is yet a further object of the present invention to provide a training system and simulation method for aircraft equipped with non-engine drive means for ground travel capable of incorporation into a generic airport simulation and into a specific airport simulation that includes all aspects of ground operations at the specific airport between landing and takeoff, including landing patterns and airport facility availability designed to enhance the efficiency of the complete airport operating environment.

It is a still further object of the present invention to provide a training system and simulation method that has the potential not only to improve airport ground operation efficiency, but also to effectively increase aircraft handling and management, the numbers of aircraft able to land within a designated time period, and airport throughput generally.

In accordance with the aforesaid objects, a training system and method for operating aircraft equipped with non-engine drive means during independent ground travel is provided. The system and method of the present invention is designed specifically to train pilots, ground personnel, and air traffic control to move an aircraft safely and efficiently on the ground during taxi and pushback using the aircraft's non-engine drive means to propel the aircraft independently during ground travel. Efficiencies in the management and control of airport ground operations made possible by the present invention produce this safe and efficient aircraft movement. Simulations and procedures for training pilots and ramp personnel in the conduct of pushback operations and forward taxi with an aircraft equipped with non-engine drive means are also provided. These simulations enable air traffic control personnel to obtain a more precise understanding of aircraft ground movements and provide information that can lead to better control of aircraft ground movement and more effective use of airport gates.

Other objects and advantages will be apparent from the following description, drawings, and claims.

BRIEF DESCRIPTION OF THE DRAWING

FIG. 1 illustrates the pushback of an aircraft equipped with non-engine drive means with simulated ramp personnel positioned in a typical location during pushback.

DESCRIPTION OF THE INVENTION

Modifications to an aircraft and the addition of new devices that change the operation of an aircraft require pilots and others tasked with keeping aircraft functioning safely and effectively to learn how to operate the modified or changed aircraft. The FAA and other regulatory agencies oversee not only modifications and new devices, but also their implementation in operating aircraft and the procedures for operating the modified aircraft and for training pilots and other operators. The present invention provides a system and method for training pilots and other operators in the safe and efficient ground travel operation of an aircraft equipped with a non-engine drive means controllable to move the aircraft independently on the ground. Additionally, increased efficiencies in the management of the protocol for non-engine drive means-equipped aircraft arriving at airports and better ground control results in improved efficiencies in landing assignments, as well as in all aspect of airport ground operations.

Aircraft are currently moved on the ground during forward taxi after landing by the operation of the aircraft's engines set a lower thrust level. At departure, pushback of the aircraft from a parking location currently requires attachment of the aircraft to a tow vehicle to move the aircraft in reverse. When the aircraft is pushed to a position where it can taxi forward to a departure runway, the tow vehicle is detached, and the aircraft's engines are operated, usually at low thrust, to move the aircraft to its departure location. The use of a non-engine drive means to move aircraft independently on the ground without reliance on the aircraft's engines or tow vehicles represents a departure from these procedures, and pilots and other operators must therefore be trained to use the specific procedures required to safely and efficiently move an aircraft equipped with non-engine drive means during taxi and pushback. The use of a non-engine drive means to move an aircraft on the ground also provides time savings, which must be factored into training relating to airport operating procedures. This time savings, along with other substantial savings, has a direct positive impact on an airport's throughput of aircraft and passengers in any given time period.

As used herein, the term "non-engine drive means" is intended to encompass any drive means for an aircraft that is capable of driving the aircraft independently on the ground without using the aircraft's main engines or an external tow vehicle. As discussed above, various non-engine drive means for moving an aircraft independently on the ground have been proposed. The system and method of the present invention are intended to encompass any of these non-engine drive means. Preferably, a non-engine drive means in an aircraft in accordance with the present invention will provide power to a nose wheel or other aircraft wheel, such as a main landing gear wheel, and will be mounted in a location selected to produce a driving relationship with one or more of the selected aircraft wheels to move the wheels at a desired speed and torque. Non-engine drive means useful for this purpose may be selected from those known in the art. One preferred drive means is a high phase order electric motor of the kind described in, for example, U.S. Pat. Nos. 6,657,334; 6,838,791; 7,116,019; and 7,469,858, all of which are owned in common with the present invention. A geared motor type of drive means, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of non-engine drive means capable of driving an aircraft on the ground during ground travel, including but not limited to electric induction motors, permanent magnet brushless DC motors, switched reluctance motors, hydraulic pump/motor assemblies, and pneumatic motors may be used to power drive wheels to produce aircraft ground travel. Other non-engine drive means designs capable of high torque operation across a desired speed range that can function as described herein may also be suitable for producing independent aircraft ground movement. Power for the non-engine drive means is preferably supplied by the aircraft auxiliary power unit (APU) and may also be supplied by any other appropriate aircraft or non-aircraft power source.

Preferably, the operation of the non-engine drive means to independently drive the aircraft during taxi and pushback can be controlled by suitable controls located in the aircraft cockpit or in another convenient location. The non-engine drive means is also preferably selectively operable to drive the aircraft on the ground only when the non-engine drive means can be operated appropriately and safely. The non-engine drive means is not intended to be operational during flight. For example, the non-engine drive means should be rendered inactive and nonoperational or in a "stowed" condition in at least the following conditions. Whenever the aircraft's brakes are touched, the non-engine drive means is inactivated; the non-engine drive means is not used to brake the aircraft. When the aircraft speed exceeds 30 miles per hour, the non-engine drive means is stowed. In traction control situations, the non-engine drive means may be inactivated and will not effectively drive the aircraft. It is preferred that the non-engine drive means be connected to an indicator, such as a red light for example, in the cockpit controls array which, when lighted, indicates that the non-engine drive means has not been properly inactivated and the aircraft should not proceed to takeoff until the situation is resolved. Other situations and conditions relating to the activation or inactivation of the non-engine drive means could arise that might affect aircraft taxi, pushback, or other ground travel and are also contemplated to be within the scope of the present invention.

Not all aircraft arriving at an airport at the same time are likely to be equipped with non-engine drive means, and some aircraft will need to use their engines and/or tow vehicles during taxi or pushback until they are equipped with non-engine drive means or for other reasons. Taxi and ramp procedures for aircraft with non-engine drive means will be different from those for other aircraft, and all personnel involved with aircraft ground movement will require training in these procedures. Pilots will need training in the operation of the non-engine drive means as well as in specific pilot responsibilities arising from the use of the aircraft cockpit controls for the non-engine drive means and communication with ramp personnel. Ramp personnel will require training in the signals needed to communicate with the pilot during taxi in and during pushback. Visual and/or audio signals can be used for this communication, which can take place through conventional or cordless headsets. Ground operations personnel, both those who drive ground vehicles and those who do not, will need training directed to situational awareness of non-engine drive means—equipped aircraft and, particularly, in the recognition of non-engine drive means equipped aircraft in a pushback operation. Additionally, maintenance personnel will require training in the maintenance of the aircraft non-engine drive means and in the towing of aircraft equipped with non-engine drive means when required for maintenance. The increased airport throughput that results when aircraft ground travel is controlled by non-engine drive means can impact all airport operations, from initial contact with the air traffic control in an airport tower, to control of aircraft landing sequence, to operations and instructions after takeoff when the aircraft is transferred to the next flight control center. Training must also encompass these situations.

Communications between the pilot in an aircraft equipped with a non-engine drive means and ramp personnel can, as indicated, be audio or visual. Audio communications are preferably conducted in conjunction with normal radio communication procedures with airport ground operations. The pilot must be trained, at a minimum, to communicate "yes," and "no" to ramp personnel in environmental conditions that include low visibility. Any other communications necessary for taxi in, taxi out, or pushback between the pilot and ramp or other personnel should also be taught. Visual communications are preferred over audio communications, since audio communications typically rely on a jack connection that is disconnected at the end of pushback. Visual communications may be conducted from the pilot or crew by flashing or different colored lights positioned in selected locations on the aircraft and/or by hand held lights. Other visual devices could also be used and are contemplated to be within the scope of the present invention.

The system and method of the present invention provides specific training in the ground movement of an aircraft equipped with non-engine drive means for pilots. Aircraft cockpit simulators are known in the art and can be adapted as needed to incorporate cockpit controls and processes specific to moving an aircraft during taxi or pushback with non-engine drive means. It is contemplated that these simulators could be used in conjunction with the training of pilots to drive aircraft equipped with non-engine drive means. A generic airport simulator can be used with the present invention. It is preferred, however, that simulators specific to selected airports be used. This type of simulator should include a complete ongoing mosaic of all airport operations. The significantly increased airport throughput possible when aircraft are driven on the ground by non-engine drive means results in, among other things, shorter delays in takeoff procedures and fewer unexpected problems with airport procedures and operations.

A more effective training method for aircraft pushback from an airport terminal or gate can be conducted in an aircraft with non-engine drive means as shown in FIG. 1. FIG. 1 illustrates an aircraft 20 at a parking location at an airport terminal 22. The nose 24 of the aircraft is directed toward the terminal 22. The aircraft 20 must travel in reverse away from the terminal 22 to reach a position where it can travel in a forward direction to a runway for takeoff. This will involve moving the aircraft in reverse and then steering it so that the nose 24 or the tail 26 is directed to either the right or the left to enable the aircraft to turn in the direction required to clear the gate or ramp area and move forward to the runway. The pilot and ramp personnel should decide prior to pushback whether the steering will be described as either nose-left/nose-right or tail-left/tail-right, and, ideally, this terminology should be standardized and used consistently. This information should also be communicated to air traffic control personnel in the tower so that operating efficiency for the entire airport will benefit.

Pushback training conducted while the pilot is driving the aircraft with the non-engine drive means preferably includes simulated ramp or other ground personnel. Simulated ramp, ground, and other personnel can be made in a variety of ways. In one approach, simulated personnel are made from wire frames sized and constructed to be clearly visible to a pilot driving the aircraft during pushback when positioned in optimum locations during simulated pushback. FIG. 1 shows two such simulated personnel 30 and 32.

The precise positions of the simulated ramp personnel 30 and 32 will depend on airport and airline protocols and customs. The typical pushback ramp personnel locations in FIG. 1 include a marshal 30 at the nose end of the aircraft and a wingman 32 at the tip of the aircraft wing 28 where visibility of the aircraft wing 28 and tail 26 is optimum. These ramp personnel locations are suitable for an aircraft turning tail-left, in the direction of the arrow 40. If the aircraft must turn tail-right, the position of the wingman 32 would be on the opposite side of the aircraft.

Pilots and ramp personnel should be instructed that inadvertent, and often unnoticed, forward roll can be avoided during pushback and in low visibility conditions by delaying engine starts, when used, until pushback has ended. The aircraft non-engine drive means may be used to drive the aircraft after pushback to the takeoff runway, and the main aircraft engine may not be required to be started until the requisite time before takeoff. Pushback training for pilots driving aircraft equipped with non-engine drive means preferably also includes consideration of other possible situations, including but not limited to, other ramp or airport ground traffic that only either the pilot or ramp personnel see and any need to return to the gate that is commanded by either the pilot or ramp personnel.

Airlines may use an aircraft's non-engine drive means for pushback and not for taxi to a takeoff runway following pushback in some circumstances, such as when the aircraft's APU is not operational and an engine is already running or when the taxi time is sufficiently short that there is not time to use the non-engine drive means. Pushback training should include these possibilities as well as those discussed above.

The training for forward movement or taxi of an aircraft equipped with non-engine drive means is more straight forward than pushback training, in part because moving in a forward direction is more intuitive than moving in reverse and turning. A commonly used checklist, such as that in FAA Operational Manual Part A, can be modified or updated to include which systems are powered and can be checked from the APU power alone and which require the aircraft's engines to be running. As noted above, the non-engine drive means is preferably powered by the aircraft APU. The simulator must take into account the increased frequency of actual airport cycles, and the FAA Operational Manual will need to be upgraded accordingly.

Examples of a situation related to the forward movement of an aircraft equipped with non-engine drive means that should be included in the training of pilots driving the aircraft and other personnel, includes, for example, situational awareness while a speed hold function, similar to cruise control, is used during taxi. Additional training situations could also include action to be taken in environmental conditions such as tail winds, head winds, and low visibility, procedures to be followed during low traction, on slopes, and in the presence of unexpected ground vehicles, and responding to degraded performance in certain conditions, such as long runway delays in hot weather conditions. Other training scenarios might involve establishing an alternate power flow in the event the APU becomes inoperative and uses of an override or like control if provided to inactivate or reduce the torque produced by the non-engine drive means when situations require this.

It is anticipated that the training system of the present invention will be incorporated into existing protocols and subsequently integrated into simulators and training following standard practices. Driving an aircraft on the ground with non-engine drive means during taxi can be integrated into standard airline ground movement and taxi training. This training typically includes generic and specific airport simulations, and the aircraft ground movement non-engine drive means training system of the present invention is designed to be incorporated into both the generic and specific airport simulations, preferably as a plug and play module. It is additionally anticipated that training for pilots and other personnel operating aircraft equipped with non-engine drive means will be integrated into recurrent aircraft training. This feature can be disabled in the recurrent training for airlines that do not have aircraft equipped with non-engine drive means for ground travel in their fleet.

While the present invention has been described with respect to preferred embodiments, this is not intended to be limiting, and other arrangements and structures that perform the required functions are contemplated to be within the scope of the present invention.

INDUSTRIAL APPLICABILITY

The training system and method of the present invention will find its primary applicability in training pilots, ground personnel, air traffic control, and others to move aircraft equipped with non-engine drive means safely, efficiently, and with more control over actual operations during taxi, pushback, and other ground travel so that the total throughput of an existing airport physical plant is effectively increased through more efficient operations and with fewer delays than has heretofore been possible.

The invention claimed is:

1. A ground operation training system for training pilots to safely and efficiently operate aircraft modified to move on the ground during forward taxi and pushback with non-engine drive motors and without thrust from aircraft engines and attachment to tow vehicles within an airport ramp area comprising:
   a. a pilot in training in a cockpit of an aircraft modified to be driven on the ground with only power from pilot-controlled drive motors mounted within one or more nose or main landing gear wheels and without thrust from aircraft engines and attachment to tow vehicles;
   b. controls to operate the landing gear wheel-mounted drive motors in the cockpit of the modified aircraft operable by the pilot in training to power the drive motors and drive the modified aircraft with only the landing gear wheel-mounted drive motors and without thrust from aircraft engines and attachment to tow vehicles during forward taxi and pushback in the airport ramp area;
   c. positionable simulated airport ramp personnel sized and constructed to simulate actual airport ramp and ground personnel and to be clearly visible to the pilot in training driving the modified aircraft and positioned outside the modified aircraft in airport ramp area locations where airport and airline protocols require the actual airport ramp and ground personnel to be positioned to guide the modified aircraft during pushback; and
   d. training procedures and protocols directing the pilot in training operating the modified aircraft how to drive the modified aircraft with only the landing gear wheel-mounted drive motors and without thrust from aircraft engines and attachment to tow vehicles and with situational awareness of the simulated ground personnel during forward taxi and pushback within the airport ramp area.

2. The training system of claim 1, wherein the positionable simulated airport ramp personnel comprise wire frames sized and constructed to simulate an actual ground marshal and an actual wingman positioned in the airport ramp area locations during pushback training where airport and airline protocols require at least an actual ground marshal and an actual wingman to be positioned during actual pushback.

3. A method for training aircraft pilots in procedures specifically required to drive an aircraft modified with landing gear wheel-mounted non-engine drive motors for ground movement without operation of aircraft engines and attachment to tow vehicles safely and efficiently during forward taxi and pushback within a ramp area at an airport, comprising:

a. providing an aircraft modified with pilot-controllable non-engine drive motors mounted to power one or more nose or main landing gear wheels and drive the aircraft without thrust from aircraft engines and attachment to tow vehicles during forward taxi into and pushback out of an airport ramp area, providing cockpit controls in a cockpit of the modified aircraft to operate the pilot-controllable non-engine drive motors, providing a pilot in training learning to operate the non-engine drive motors with the cockpit controls and drive the modified aircraft during simulated forward taxi into and pushback out of the airport ramp area, and providing airport ramp procedures for the pilot in training learning to drive the modified aircraft without aircraft engines and attachment to tow vehicles into and out of the airport ramp area;

b. during simulated forward taxi of the modified aircraft into the airport ramp area, controlling the non-engine drive motors with the cockpit controls by the pilot in training, driving the modified aircraft with only the non-engine drive motors forward into the airport ramp area, and parking the modified aircraft as required by the airport ramp procedures;

c. providing positionable simulated airport ramp personnel to simulate actual airport ramp and ground personnel sized and constructed to be clearly visible to the pilot in training driving the modified aircraft; and d. during a training operation simulating pushback of the modified aircraft out of the airport ramp area, positioning the positionable simulated airport ramp personnel in optimal locations in the ramp area required by the airport ramp procedures for the actual airport ramp personnel during actual pushback, controlling the non-engine drive motors with the cockpit controls by the pilot in training and driving the modified aircraft in reverse with only the non-engine drive motors, turning the modified aircraft tail left or tail right relative to the optimal ramp locations of the positionable simulated airport ramp personnel as required during the simulated pushback, and driving the modified aircraft forward out of the ramp area with only the non-engine drive motors.

4. The method of claim 3, further comprising training air traffic control personnel and airport ground personnel at the airport to guide and direct pilots in training to drive the modified aircraft with only the landing gear wheel-mounted non-engine drive motors and without aircraft engines and attachment to tow vehicles during forward taxi and pushback, and guiding and directing the pilot in training by the air traffic control personnel and the airport ground personnel to drive the modified aircraft with only the landing gear wheel-mounted non-engine drive motors during forward taxi and pushback.

5. The method of claim 3, further comprising providing an electronic cockpit simulation of the training method for the pilot in training with the cockpit controls for the non-engine drive motors simulating controlling the pilot-controllable non-engine drive motors during forward taxi into and pushback out of the airport ramp area and simulating the optimal ramp locations of the positionable simulated airport ramp and ground personnel, and, with the electronic cockpit simulation and the cockpit controls, the pilot in training simulates operating the non-engine drive motors and driving the modified aircraft forward into the airport ramp area and parking the modified aircraft, and simulates operating the non-engine drive motors and driving the modified aircraft during pushback to move in reverse and turn tail left and tail right relative to the optimal ramp locations of the positionable simulated airport ramp and ground personnel, and then simulates driving forward out of the ramp area with only the non-engine drive motors.

6. A method that trains aircraft pilots, airport air traffic control personnel, and airport ground personnel to move aircraft and to direct ground movements of aircraft modified to be driven only by landing gear wheel-mounted pilot-controllable non-engine drive motors and without aircraft engines and attachment to tow vehicles during forward taxi and pushback at airports where both the modified aircraft and unmodified aircraft moved with operating engines and tow vehicles are moved into and out of airport ramp areas, comprising:

a. providing aircraft modified to be driven only by landing gear wheel-mounted pilot-controllable non-engine drive motors and without operating aircraft engines and attachment to tow vehicles and providing cockpit controls operable by the pilot to drive the modified aircraft with only the landing gear wheel-mounted non-engine drive motors at the airports where both the modified aircraft and the unmodified aircraft moved only with operating engines and tow vehicles are moved into and out of airport ramp areas;

b. providing a protocol for training aircraft pilots to drive the modified aircraft during forward taxi and pushback and a protocol for training airport air traffic control personnel and ground personnel to identify the modified aircraft and to direct ground movement of both the modified aircraft and the unmodified aircraft during taxi and pushback into and out of the airport ramp areas;

c. providing in the protocol for training aircraft pilots procedures for driving the modified aircraft using the cockpit controls to control operation of the non-engine drive motors to drive and maneuver the modified aircraft with only the non-engine drive motors during taxi and pushback and within airport ramp areas in a plurality of possible taxi and pushback ground travel conditions and situations, comprising driving the modified aircraft in the presence of defined ground surface conditions, driving the modified aircraft in the presence of ground vehicles and ground personnel, driving the modified aircraft in the presence of other modified aircraft and in the presence of the unmodified aircraft, and procedures for communicating with the airport air traffic control personnel and the airport ground personnel while the aircraft pilots are driving the modified aircraft;

d. providing in the protocol for training airport air traffic control personnel and airport ground personnel procedures for identifying the modified aircraft, for communicating with the aircraft pilots driving the modified aircraft, and for directing ground travel of the modified aircraft during the plurality of possible taxi and pushback ground travel conditions and situations while the aircraft pilots are driving the modified aircraft;

e. incorporating the protocol for training the aircraft pilots driving the modified aircraft and the protocol for training the airport air traffic control personnel and the airport ground personnel directing the aircraft pilots driving the modified aircraft into existing protocols for training aircraft pilots and airport air traffic control personnel and airport ground personnel; and f. using the protocols for training and the procedures and training the aircraft pilots, the airport air traffic control personnel, and the airport ground personnel to move and to identify and direct ground movements of the modified aircraft at the airports where both the modified aircraft and the unmodified aircraft are moved into and out of the airport ramp areas.

7. The method of claim 6, further comprising providing procedures in the protocols for training the aircraft pilots and the airport air traffic control personnel and the airport ground personnel to drive the modified aircraft and to direct ground travel of the modified aircraft at a generic airport or at a specific airport, and directing ground travel and driving the modified aircraft at the generic airport or at the specific airport.

8. The method of claim 6, further comprising selecting at least one of the plurality of possible taxi and pushback ground travel conditions and situations in the protocol for training, using the cockpit controls by the aircraft pilot to drive and maneuver the modified the modified aircraft with only the non-engine drive motors as required by the selected taxi and pushback ground travel condition or situation, and directing the aircraft pilot driving and maneuvering the modified aircraft by the airport air traffic control personnel and airport ground personnel as required by the selected taxi and pushback ground travel condition or situation.

9. The method of claim 6, wherein the aircraft pilots comprise pilots previously trained to drive the modified aircraft without operating aircraft engines and attachment to tow vehicles, and further comprising providing in the protocol for training the aircraft pilots procedures to re-train the previously trained pilots to drive the modified aircraft, and driving the modified aircraft without operating aircraft engines and attachment to tow vehicles during taxi and pushback by the re-trained pilots.

10. The method of claim 9, further comprising providing an electronic cockpit simulation of the protocol for training for the aircraft pilots in training and for the previously trained pilots with the cockpit controls for the non-engine drive motors to simulate driving and maneuvering the modified aircraft during taxi and pushback with only the non-engine drive motors in the plurality of possible taxi and pushback ground travel conditions and situations, and using the cockpit controls by the aircraft pilots in training and the previously trained pilots to simulate controlling operation of the non-engine drive motors, and simulating driving and maneuvering the modified aircraft with the non-engine drive motors during the plurality of possible taxi and pushback ground travel conditions and situations.

\* \* \* \* \*